US008065726B2

(12) United States Patent
Burkley et al.

(10) Patent No.: US 8,065,726 B2
(45) Date of Patent: Nov. 22, 2011

(54) SCALABLE ANTI-REPLAY WINDOWING

(75) Inventors: Paul Burkley, Raheen (IE); Keith Critchley, County Louth (IE)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 11/748,086

(22) Filed: May 14, 2007

(65) Prior Publication Data

US 2008/0288872 A1    Nov. 20, 2008

(51) Int. Cl.
*G06F 17/00* (2006.01)
*G06F 21/00* (2006.01)
(52) U.S. Cl. ............... 726/22; 726/11; 726/12; 726/13; 726/14; 726/23; 709/223; 709/230
(58) Field of Classification Search ............. 726/26; 715/723
See application file for complete search history.

(56) References Cited

U.S. PATENT DOCUMENTS 7,237,262 B2 *   6/2007   Lahti et al. ................ 726/13
2004/0202110 A1 *  10/2004   Kim ........................... 370/235

OTHER PUBLICATIONS

Mask, Mask bit, and Masking. In Microsoft Computer Dictionary. Microsoft Press 2002.*
"Logical Shift." Wikipedia. Wikimedia Foundation, Sep. 9, 2006. Web. <http://web.archive.org/web/*/http://en.wikipedia.org/wiki/Logical_shift>.*

* cited by examiner

*Primary Examiner* — Kambiz Zand
*Assistant Examiner* — Imhotep Durham
(74) *Attorney, Agent, or Firm* — Grossman, Tucker, Perreault & Pfleger, PLLC

(57) ABSTRACT

The present disclosure provides a method for scalable anti-replay windowing. According to one exemplary embodiment, the method may include receiving at least one data packet having at least one new sequence number. The method may also include comparing the at least one new sequence number to an anti-replay window configured to prevent packet replay, the anti-replay window having at least one existing sequence number. The method may further include shifting the contents of the anti-replay window by varying the location of a starting index and an ending index. Of course, additional embodiments, variations and modifications are possible without departing from this embodiment.

18 Claims, 5 Drawing Sheets

500

Receiving at least one data packet having at least one new sequence number
502

Comparing the at least one new sequence number to an anti-replay window configured to prevent packet replay, the anti-replay window having at least one existing sequence number
504

Shifting the contents of the anti-replay window by varying the location of a starting index and an ending index
506

FIG. 5

SCALABLE ANTI-REPLAY WINDOWING

FIELD

The present disclosure describes a method for scalable anti-replay windowing.

BACKGROUND

Internet security protocols, such as IP security (IPsec) and Secure Real-time Transport Protocol (SRTP), provide an anti-replay service to help counter the denial of service (DoS) attack known as packet replay. An anti-replay window may be maintained to determine which packets have already been received (e.g., based on sequence number), and any replayed packets are rejected. Anti-replay windows for today's internet security protocols are typically implemented using a bitmap. This may be an efficient and effective way to represent the anti-replay window. As packets are received, the receiver may check the bitmap to see if this sequence number has already been received. In this way, replayed packets may be detected and rejected. Only a fixed amount of sequence numbers may be tracked by the anti-replay window (governed by the anti-replay window's size). The anti-replay window contents may be shifted as higher sequence numbers are received.

As traffic rates increase to meet the growing demands of today's networks, anti-replay windows must also scale to accommodate them. Higher traffic rates imply a wider divergence of packet ordering as packets take different paths through the network. Also, Voice over Internet Protocol (VoIP), which may prioritize voice traffic over data traffic, may lead to further divergence in packet ordering, such that data packets may fall outside the replay window. A larger anti-replay window may be needed to accommodate this wider spread of packet sequence numbers, in order to avoid rejecting many packets because they have old sequence numbers.

In some cases, a bit shift operation may be used in order to shift the contents of the anti-replay window. Unfortunately, this may not scale very well to large window sizes such as 512-bit or 1024-bit bitmaps. In order to effectively shift the bits of a large bitmap, many bit shift operations may be required. This may be difficult to implement, as the bits may require shifting from one word to the next, not merely within each word alone.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 5 is a flowchart showing operations in accordance with yet another exemplary embodiment of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides a scalable anti-replay windowing method. In some embodiments, a bitmap may be manipulated using a circular technique, therefore reducing the need for bit-shifting. Instead of the first bit always representing the start of the window (and the last bit always representing the end of the window), in this approach the bits representing the start and end of the window may change. In accordance with some embodiments, the start and end indexes may be moved, however, this may not require moving the bitmap contents. This technique may require some careful manipulation of the bitmap, however, it may produce a far more scalable technique than a bit shifting approach, and may be much more efficient when applied to large bitmaps.

Figure 1:
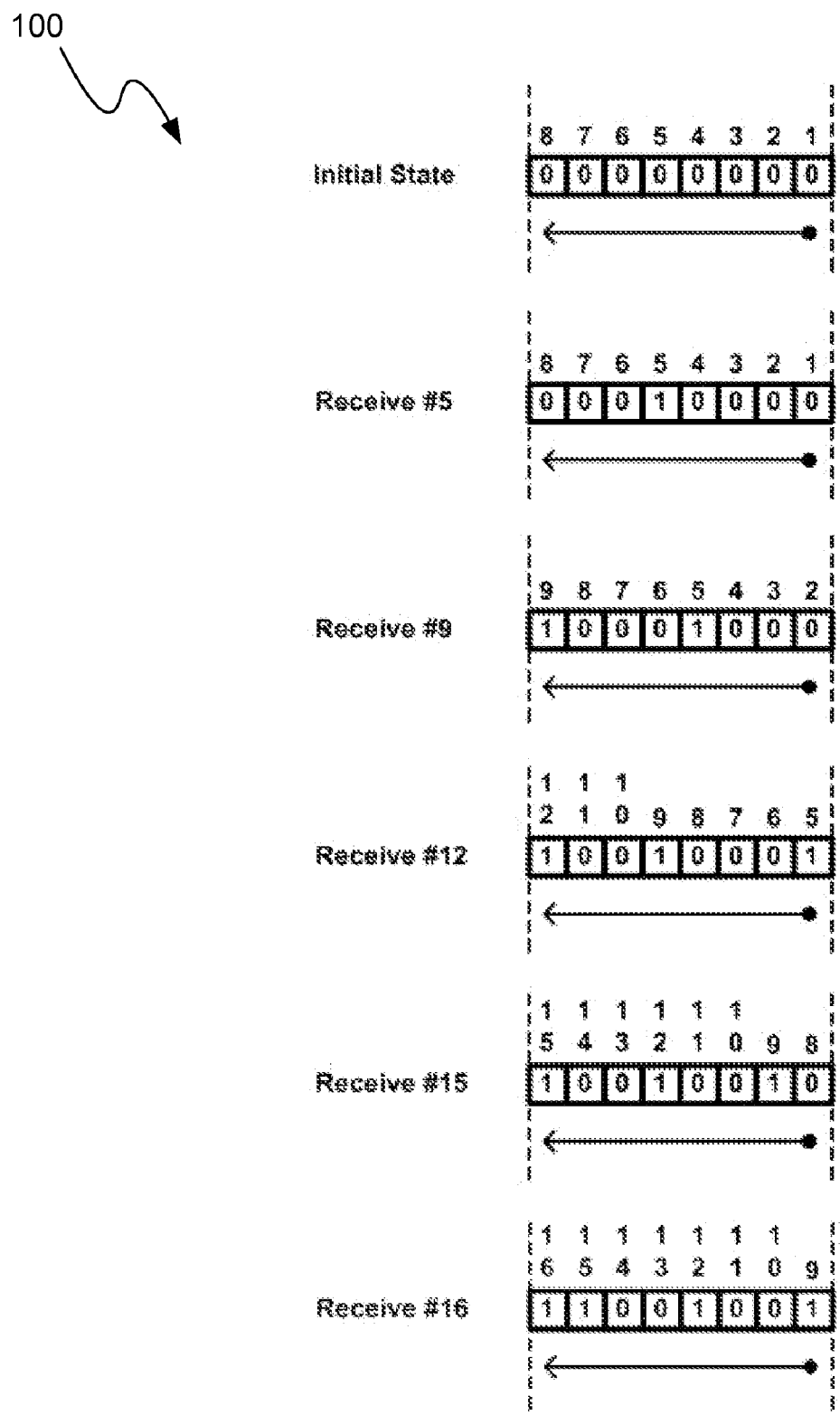
FIG. 1 is a diagram of a traditional anti-replay window.

Referring now to FIG. 1, a traditional anti-replay approach depicting various bit shifting operations is shown. The diagram of FIG. 1 shows bit shifting operations as applied to an 8-bit bitmap, however, it should be noted that any of the embodiments described herein may be extended for use with bitmaps of any bit length (e.g., 512, 1024, etc.). The term "bitmap" as used herein, is meant to refer to an array of Boolean values.

The bitmap of FIG. 1 may be updated as different sequence numbers are received. For example, a bit may be set to 1 when the corresponding sequence number is received. The annotations located above the bitmaps indicate what sequence number is represented by each bit in the bitmap. The arrows below the bitmaps indicate the direction of the bitmap and the bitmap's starting and ending points. As can be seen, in FIG. 1 the window may begin at bit 1 and end at bit 8, and the bitmap contents may be right-shifted accordingly.

In operation, the contents of the bitmap may be shifted as new sequence numbers arrive. Further, the bit shift operation may insert zeroes for the intermediate sequence numbers, for example, when sequence number #12 is received, the bits representing sequence numbers #10 and #11 may be set to zero. A right-shift operation may be implemented that may insert a sign bit, rather than zeroes. However, this may be avoided by instituting a left-shift operation and changing the direction of the anti-replay window.

Figure 2:
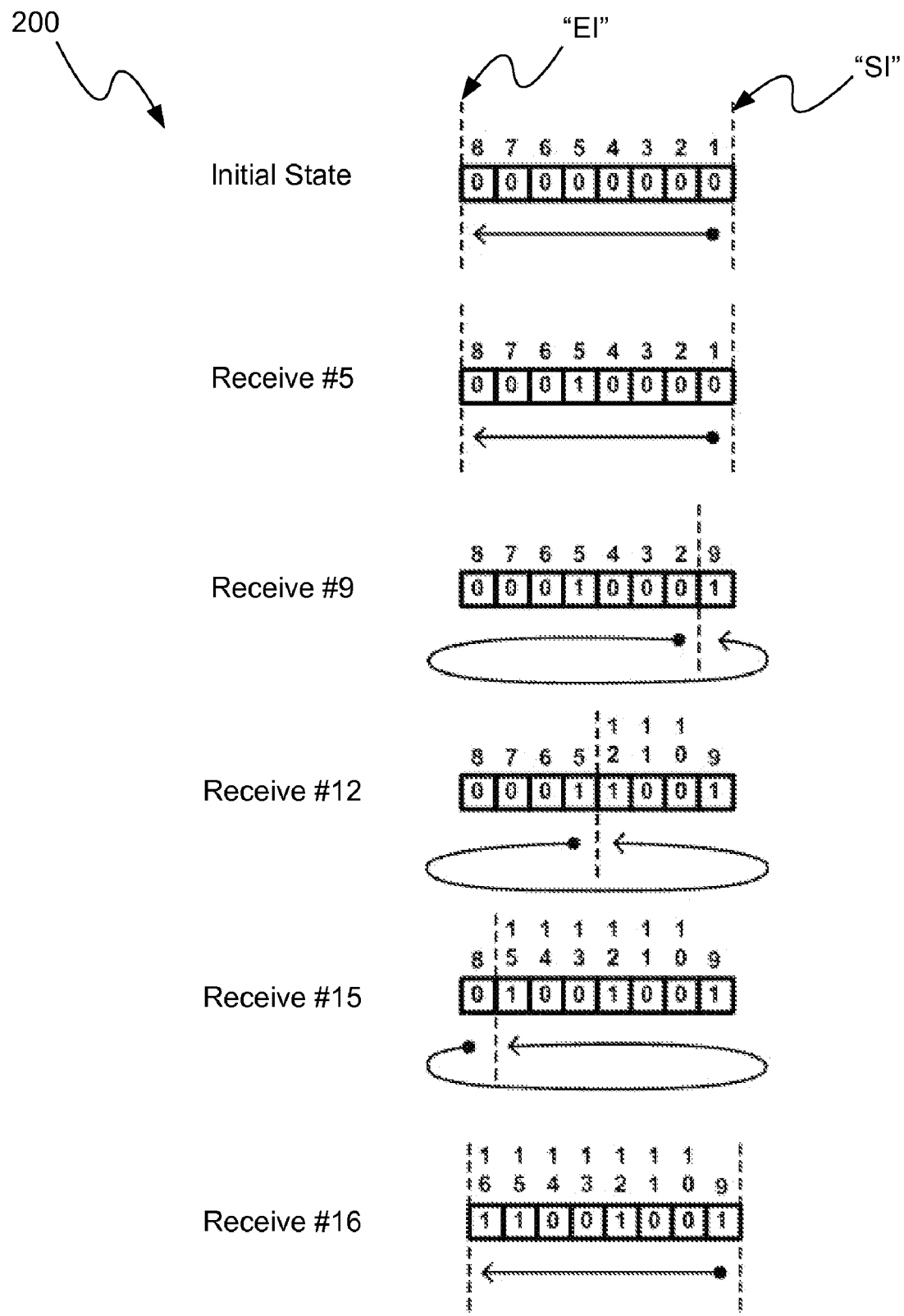
FIG. 2 is a diagram of a scalable anti-replay window in accordance with another exemplary embodiment of the present disclosure.

In accordance with the present disclosure, an exemplary embodiment of a scalable anti-replay windowing method is depicted in FIG. 2. This scalable anti-replay windowing method may utilize circular bit manipulation to implement anti-replay detection in an efficient and scalable manner. The circular bit manipulation described herein may be used in accordance with anti-replay windows of any size. In some embodiments, the anti-replay window may be a power of 2 in size (e.g. 512 or 1024 elements), which may provide a quick determination of bit positions. For example, for a 1024-bit anti-replay window, the lower 10 bits of the sequence number may be used to determine the bit position using an AND operation. Of course, various other operations may also be used.

In some embodiments, the scalable anti-replay window may begin and end at different points within the bitmap as time progresses, without shifting the contents of the bitmap. For example, FIG. 2 shows a starting index "SI" and an ending index "EI". The location of these indexes may be varied in order to shift the contents of the anti-replay window.

In some embodiments, interim bits (e.g., bits located between received sequence numbers) may be explicitly zeroed as new sequence numbers arrive. For example, when sequence number #15 is received, the bits representing sequence numbers #13 and #14 may be explicitly set to zero. This may be performed using a variety of different techniques (e.g., by creating an appropriate mask and AND'ing this mask with the bitmap, etc.). The pseudocode provided below demonstrates an example showing how to create and apply this mask.

```
unsigned int window[4]; /* 128-bit */
unsigned int maxSeqNum;
#define WINDOW_SIZE 128
int receive(unsigned int seqNum)
{
  /* if sequence number is before the window, fail */
  if ((seqNum + WINDOW_SIZE) <= maxSeqNum)
  {
    return 0;
  }
  else /* sequence number is in or after the window */
  {
    int wordPos = (seqNum & (WINDOW_SIZE – 1)) >> 5; /* divided by 32 */
    int bitPos = (seqNum & 0x1f); /* 0 - 31 */
    /* if sequence number is in the window */
    if (seqNum <= maxSeqNum)
    {
      /* if bit is already set then we have a replayed packet, fail */
      if (window[wordPos] & (1 << bitPos))
      {
        return 0;
      }
    }
    else /* sequence number is after the window */
    {
      if ((seqNum – maxSeqNum) < WINDOW_SIZE)
      {
        int maxWordPos = (maxSeqNum & (WINDOW_SIZE – 1)) >> 5; /* divided by 32 */
        int maxBitPos = (maxSeqNum & 0x1f); /* 0 - 31 */
        /* zero bits between the two bit positions */
        if ((wordPos == maxWordPos) && (bitPos > maxBitPos))
        {
          window[wordPos] &= ((0xffffffff << bitPos) | ~(0xfffffffe << maxBitPos));
        }
        else
        {
          int i = maxWordPos;
          while ((i = (i + 1) & ((WINDOW_SIZE – 1) >> 5)) != wordPos)
          {
            window[i] = 0;
          }
          window[wordPos] &= (0xffffffff << bitPos);
          window[maxWordPos] &= ~(0xfffffffe << maxBitPos);
        }
      }
      else
      {
        memset(window, 0, sizeof(window));
      }
      /* update maximum sequence number */
      maxSeqNum = seqNum;
    }
    /* set the appropriate bit to 1 */
    window[wordPos] |= (1 << bitPos);
  }
  return 1;
}
void verify(int okActual, int okExpected, int w3, int w2, int w1, int w0)
{
  if ((okActual == okExpected) &&
      (window[0] == w0) && (window[1] == w1) && (window[2] == w2) && (window[3] == w3))
  {
    printf("Verification succeeded\n");
  }
  else
  {
    printf("Verification failed\n");
  }
```

-continued

```
  }
  int main( )
  {
      int i, ok;
      /* initialize window to all first 127 sequence numbers received */
      /* note bit 0 initially corresponds to seqNum #0 which doesn't actually exist */
      memset(window, 0xff, sizeof(window));
      maxSeqNum = 127;
      ok = receive(128); /* 1 ahead, next word */
      verify(ok, 1, 0xffffffff, 0xffffffff, 0xffffffff, 0xffffffff);
      ok = receive(138); /* 10 ahead, same word */
      verify(ok, 1, 0xffffffff, 0xffffffff, 0xffffffff, 0xfffffc01);
      ok = receive(168); /* 30 ahead, next word */
      verify(ok, 1, 0xffffffff, 0xffffffff, 0xffffff00, 0x00000401);
      ok = receive(228); /* 60 ahead, 2nd next word */
      verify(ok, 1, 0xfffffff0, 0x00000000, 0x00000100, 0x00000401);
      ok = receive(100); /* should fail, before window */
      verify(ok, 0, 0xfffffff0, 0x00000000, 0x00000100, 0x00000401);
      ok = receive(128); /* should fail, already received */
      verify(ok, 0, 0xfffffff0, 0x00000000, 0x00000100, 0x00000401);
      ok = receive(168); /* should fail, already received */
      verify(ok, 0, 0xfffffff0, 0x00000000, 0x00000100, 0x00000401);
      ok = receive(129); /* should succeed */
      verify(ok, 1, 0xfffffff0, 0x00000000, 0x00000100, 0x00000403);
      ok = receive(169); /* should succeed */
      verify(ok, 1, 0xfffffff0, 0x00000000, 0x00000300, 0x00000403);
      ok = receive(209); /* should succeed */
      verify(ok, 1, 0xfffffff0, 0x00020000, 0x00000300, 0x00000403);
      ok = receive(355); /* 127 ahead, should clear all but 1st+last bits */
      verify(ok, 1, 0x00000018, 0x00000000, 0x00000000, 0x00000000);
      ok = receive(483); /* 128 ahead, should clear all but last bit */
      verify(ok, 1, 0x00000008, 0x00000000, 0x00000000, 0x00000000);
      ok = receive(640); /* 157 ahead, should clear all but last bit */
      verify(ok, 1, 0x00000000, 0x00000000, 0x00000000, 0x00000001);
      ok = receive(300); /* 340 behind, should fail */
      verify(ok, 0, 0x00000000, 0x00000000, 0x00000000, 0x00000001);
      ok = receive(512); /* 128 behind, should fail */
      verify(ok, 0, 0x00000000, 0x00000000, 0x00000000, 0x00000001);
      ok = receive(513); /* 127 behind, should set the 2nd last bit */
      verify(ok, 1, 0x00000000, 0x00000000, 0x00000000, 0x00000003);
      return 0;
  }
```

In some embodiments, sequence numbers may be received in order in a monotonically increasing arrangement. This may require one AND operation of the appropriate word (e.g., 32 bit) within the bitmap, and one OR operation to set the bit corresponding to the new sequence number. Further, the circular approach described herein may not require any special hardware instructions, and may be efficiently implemented using standard operations.

Figure 3:
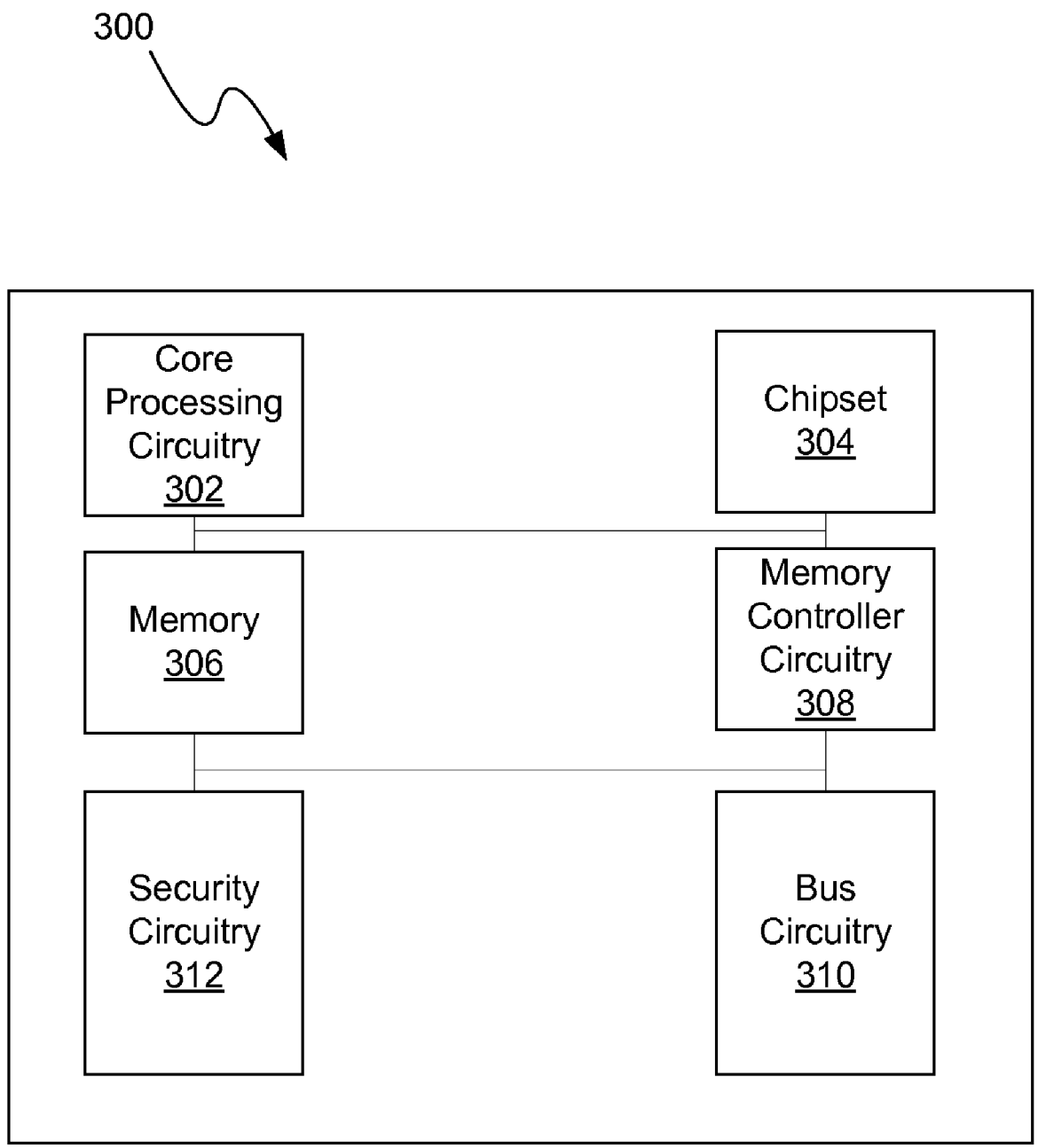
FIG. 3 is a block diagram of an integrated circuit in accordance with yet another exemplary embodiment of the present disclosure.

Referring now to FIG. 3, an exemplary embodiment of an integrated circuit (IC) 300 in accordance with the present disclosure is shown. The term "integrated circuit", as used in any embodiment herein, may refer to a semiconductor device and/or microelectronic device, such as, for example, but not limited to, a semiconductor integrated circuit chip. IC 300 may include core processing circuitry 302, which may include a variety of different processors, e.g., an Intel® Pentium® M processor commercially available from the Assignee of the subject application. Of course, many other processors may be used without departing from the scope of the present disclosure. IC 300 may also include chipset 304. In some embodiments, chipset 304 may include both memory controller hub (MCH) and I/O controller hub (ICH) circuitry. These components may be included within chipset 304 or at any other location within IC 300.

IC 300 may also include memory 306, which may be in communication with core processing circuitry 302. Memory 306 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory may comprise other and/or later-developed types of computer-readable memory. In some embodiments, memory 306 may include, for example, 256 KB of two-way level 2 cache.

IC 300 may additionally include memory controller circuitry 308 configured to manage the flow of data to and from memory. For example, in some embodiments, memory controller circuitry 308 may include a double-data-rate two synchronous dynamic random access memory (DDR2 SDRAM) controller. IC 300 may further include bus circuitry 310 configured to provide compatibility with a variety of different bus architectures, including, but not limited to, Universal Serial Bus (USB), Serial Advanced Technology Attachment (SATA), Peripheral Component Interface (PCI), PCI-Express and System Management Bus (SMBus).

IC 300 may also include security circuitry 312, which may be configured to include any or all of the embodiments described herein, such as the scalable anti-replay method shown in FIG. 2. Security circuitry 312 may be configured to authenticate and/or encrypt IP data packets in a data stream. Security circuitry 312 may also be configured to implement various protocols such as IP security (IPsec), which may be used in a variety of cryptographic operations. Security circuitry 312 may further include circuitry capable of handling cipher (e.g., Data Encryption Standard (DES), Triple Data Encryption Standard (3DES), Advanced Encryption Standards (e.g., AES-128, AES-192, AES-256), Rivest Cipher (RC), Kasumi, etc.), hash (e.g., Message Digest (e.g., MD5), secure hash (e.g., SHA-1, SHA-X, etc.), etc.) and public key encryption operations.

Figure 4:
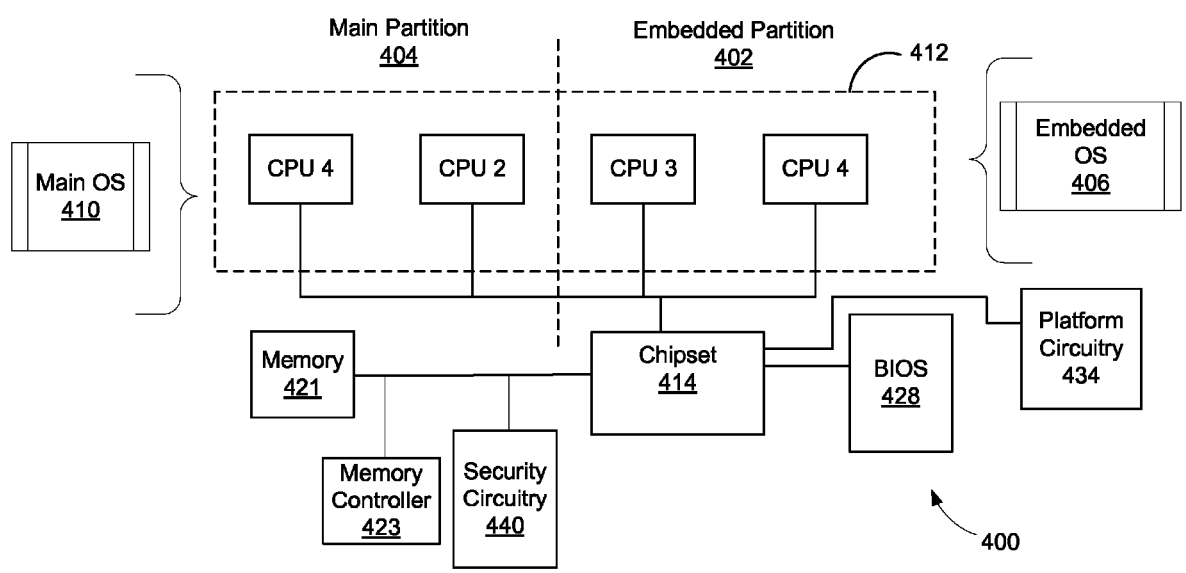
FIG. 4 is a block diagram of a system in accordance with an additional exemplary embodiment of the present disclosure.

The methodology of FIGS. 2-3 may be implemented, for example, in a variety of multi-threaded processing environments. For example, FIG. 4 is a diagram illustrating one exemplary system embodiment 400, which may be configured to include aspects of any or all of the embodiments described herein.

In some embodiments, system 400 may include a core processing circuitry 412, chipset 414 and memory 421. Core processing circuitry 412 may include any variety of processors known in the art, including those having a plurality of cores, for example, an Intel® Pentium® D dual core processor commercially available from the Assignee of the subject application. However, this processor is provided merely as an example, and the operative circuitry described herein may be used in other processor designs and/or other multi-threaded integrated circuits. Core processing circuitry 412 may comprise an integrated circuit (IC), such as IC 300 described above in FIG. 3.

In this embodiment, the core processing circuitry 412 may include a plurality of core CPUs, for example, CPU1, CPU2, CPU3 and CPU4. Of course, as described above, additional or fewer processor cores may be used in this embodiment. Core processing circuitry 412 may be logically and/or physically divided into a plurality of partitions. For example, in this embodiment, processing circuitry 412 may be divided into a main partition 404 that includes CPU1 and CPU2, and an embedded partition 402 that includes CPU3 and CPU4. The main partition 404 may be capable of executing a main operating system (OS) 410, which may include, for example, a general operating system such as Microsoft® Windows® XP, commercially available from Microsoft Corporation, and/or other "shrink-wrap" operating system such as Linux, etc.

Chipset 414 may include integrated circuit chips, such as those selected from integrated circuit chipsets commercially available from the assignee of the subject application (e.g., graphics memory and I/O controller hub chipsets), although other integrated circuit chips may also, or alternatively be used. "Circuitry", as used in any embodiment herein, may comprise, for example, singly or in any combination, hardwired circuitry, programmable circuitry, state machine circuitry, and/or firmware that stores instructions executed by programmable circuitry.

System 400 may include various forms of memory, such as those described above. In some embodiments, machine-readable firmware program instructions may be stored in memory 421. These instructions may be accessed and executed by the main partition 404 and/or the embedded partition 402 of host processor 412. System 400 may include system memory capable of storing commands, instructions, and/or data for operation of the main partition 404 and embedded partition 402. System 400 may further include a memory controller 423, such as a double-data-rate two synchronous dynamic random access memory (DDR2 SDRAM) controller 423.

System 400 may also include system built-in operating system (BIOS) 428 that may include instructions to configure the system 400. In this embodiment, BIOS 428 may include instructions to configure the main partition 404 and the embedded partition 402 in a manner described herein using, for example, platform circuitry 434. Platform circuitry 434 may include platform resource layer (PRL) instructions that, when instructed by BIOS 428, may configure the host processor into partitions 402 and 404 and sequester one or more cores within each partition. The platform circuitry 434 may comply or be compatible with CSI (common system interrupt), Hypertransport™ (HT) Specification Version 3.0, published by the HyperTransport™ Consortium and/or memory isolation circuitry such as memory isolation circuitry such as a System Address Decoder (SAD) and/or Advanced Memory Region Registers (AMRR)/Partitioning Range Register (PXRR).

System 400 may include security circuitry 440, which may be configured to perform the scalable anti-replay windowing described herein as well as any of the operations included within the security circuitry shown in FIG. 3. Security circuitry 440 may be included either within or external to core processing circuitry 412 as shown in FIG. 4. Security circuitry 440 may be configured to utilize circular bit manipulation to implement anti-replay detection in an efficient and scalable manner as described above.

FIG. 5 depicts a flowchart 500 of exemplary operations consistent with the present disclosure. Operations may include receiving at least one data packet having at least one new sequence number (502). The method may also include comparing the at least one new sequence number to an anti-replay window configured to prevent packet replay, the anti-replay window having at least one existing sequence number (504). The method may further include shifting the contents of the anti-replay window by varying the location of a starting index and an ending index (506). Of course, additional embodiments, variations and modifications are possible without departing from this embodiment. It should be understood that any of the operations and/or operative components described in any embodiment herein may be implemented in software, firmware, hardwired circuitry and/or any combination thereof.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic operations. Other embodiments may be implemented as software modules executed by a programmable control device.

The embodiments described herein may provide numerous advantages over the prior art. For example, the embodiments described herein provide a scalable approach capable of supporting anti-replay windows of any size, without incurring a linear growth in execution time. Existing bit shift approaches may not be scalable, and may become increasingly complex and inefficient to handle when dealing with anti-replay windows larger than 64 bits.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   receiving at least one data packet having at least one new sequence number;

comparing the at least one new sequence number to an anti-replay window configured to prevent packet replay, the anti-replay window having at least one existing sequence number, the anti-replay window having a starting index and an ending index corresponding to a starting sequence and an ending sequence of the anti-replay window, respectively; and shifting the contents of the anti-replay window by varying a location of the starting index and a location of the ending index in the anti-replay window, wherein the location of the starting index and the location of the ending index in the anti-replay window are varied circularly so that the location of the starting index is adjacent the location of the ending index within the anti-replay window after receiving at least some of the at least one data packet.

2. The method according to claim 1, wherein shifting the contents of the anti-replay window does not include physically shifting a bit within a bitmap associated with the anti-replay window.

3. The method according to claim 1, further comprising setting at least one intermediate sequence number to zero.

4. The method according to claim 3, wherein setting at least one intermediate sequence number to zero is performed by ANDing the at least one intermediate sequence number with a mask.

5. The method according to claim 1, further comprising detecting at least one replayed packet.

6. The method according to claim 5, further comprising rejecting the at least one replayed packet.

7. An apparatus, comprising:
an integrated circuit (IC) configured to receive at least one data packet having at least one new sequence number, the IC further configured to compare the at least one new sequence number to an anti-replay window configured to prevent packet replay, the anti-replay window having at least one existing sequence number, the anti-replay window having a starting index and an ending index corresponding to a starting sequence and an ending sequence of the anti-replay window, respectively, the IC further configured to shift the contents of the anti-replay window by varying a location of the starting index and a location of the ending index in the anti-replay window, wherein the location of the starting index and the location of the ending index in the anti-replay window are varied circularly so that the location of the starting index is adjacent the location of the ending index within the anti-replay window after receiving at least some of the at least one data packet.

8. The apparatus according to claim 7, wherein the IC is further configured to shift the contents of the anti-replay window without physically shifting a bit within a bitmap associated with the anti-replay window.

9. The apparatus according to claim 7, wherein the IC is further configured to set at least one intermediate sequence number to zero.

10. The apparatus according to claim 9, wherein the IC is configured to set at least one intermediate sequence number to zero by ANDing the at least one intermediate sequence number with a mask.

11. The apparatus according to claim 7, wherein the IC is configured to detect at least one replayed packet.

12. The apparatus according to claim 11, wherein the IC is configured to reject the at least one replayed packet.

13. A system, comprising:
security circuitry configured to receive at least one data packet having at least one new sequence number from a network, the security circuitry further configured to compare the at least one new sequence number to an anti-replay window configured to prevent packet replay, the anti-replay window having at least one existing sequence number, the anti-replay window having a starting index and an ending index corresponding to a starting sequence and an ending sequence of the anti-replay window, respectively, the security circuitry further configured to shift the contents of the anti-replay window by varying a location of the starting index and a location of the ending index in the anti-replay window, wherein the location of the starting index and the location of the ending index in the anti-replay window are varied circularly so that the location of the starting index is adjacent the location of the ending index within the anti-replay window after receiving at least some of the at least one data packet; and at least one memory unit configured to store the anti-replay window.

14. The system according to claim 13, wherein the security circuitry is further configured to shift the contents of the anti-replay window without physically shifting a bit of a bitmap associated with the anti-replay window.

15. The system according to claim 13, wherein the security circuitry is further configured to set at least one intermediate sequence number to zero.

16. The system according to claim 15, wherein the security circuitry is configured to set at least one intermediate sequence number to zero by ANDing the at least one intermediate sequence number with a mask.

17. The system according to claim 13, wherein the security circuitry is configured to detect at least one replayed packet.

18. The system according to claim 17, wherein the security circuitry is configured to reject the at least one replayed packet.

* * * * *